G. T. TYSON.
SAFETY TAP AND DIE HOLDER.
APPLICATION FILED APR. 21, 1913.
1,126,919.
Patented Feb. 2, 1915.
3 SHEETS—SHEET 3.
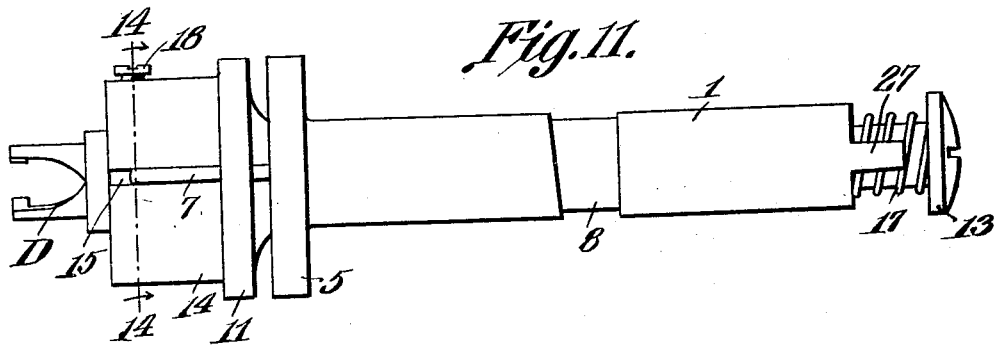
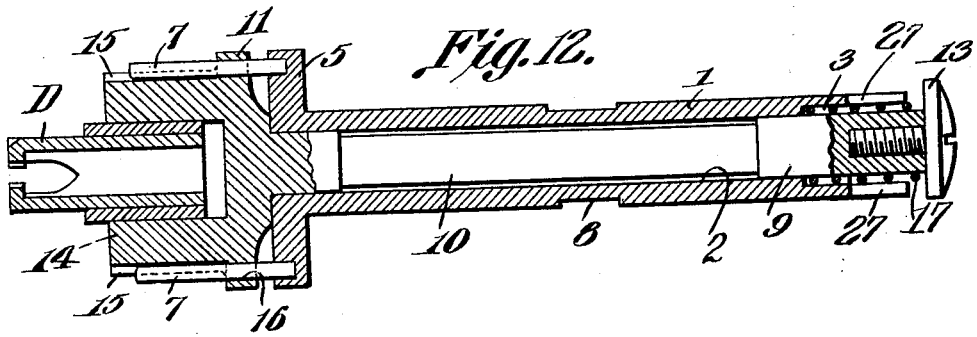
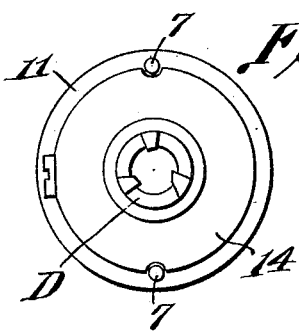
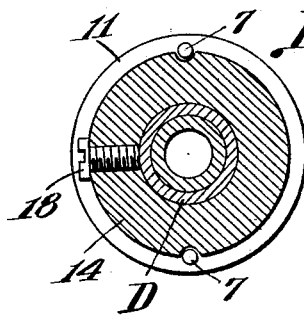
George T. Tyson, Inventor
Witnesses
by C. A. Snow & Co.
Attorneys

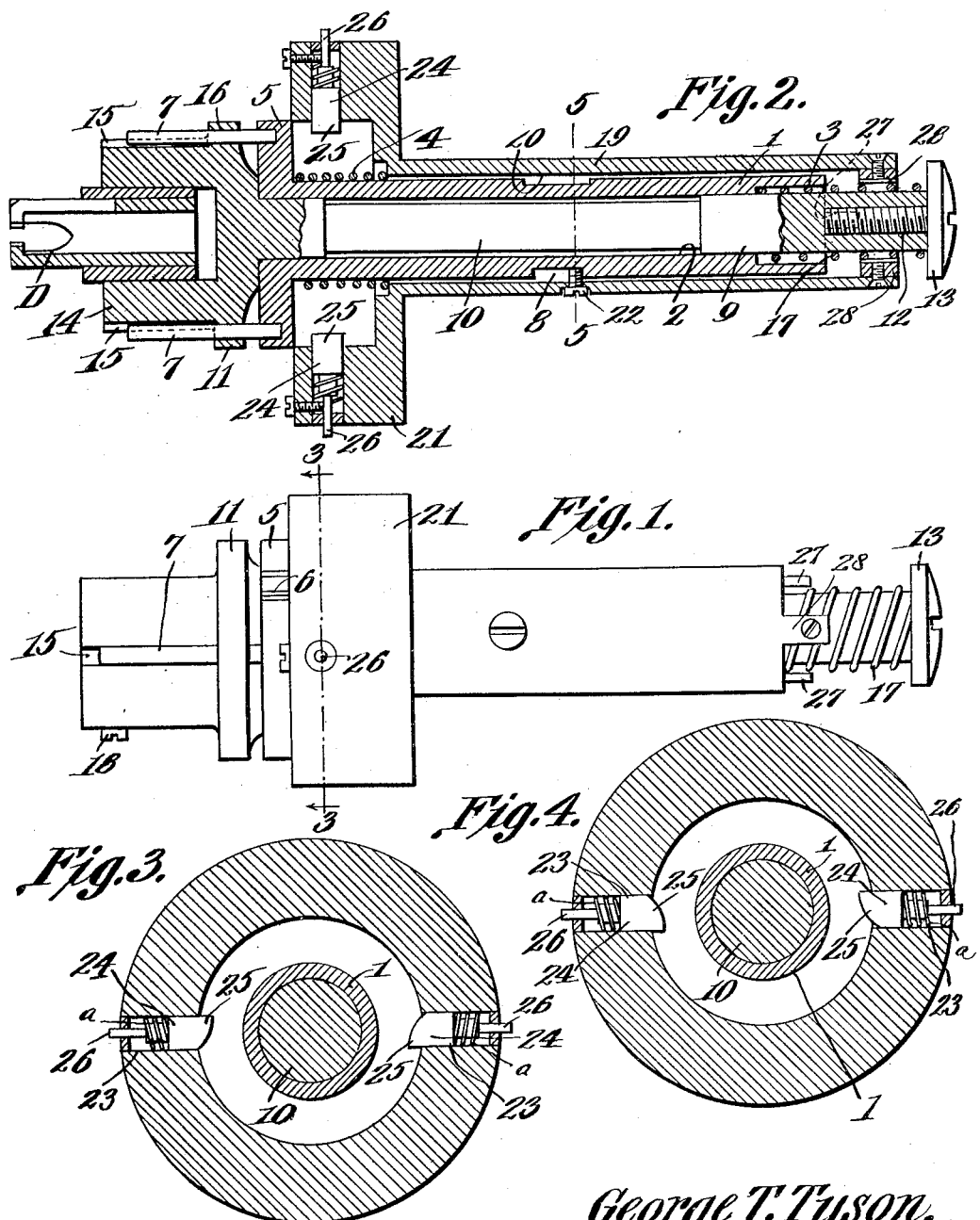

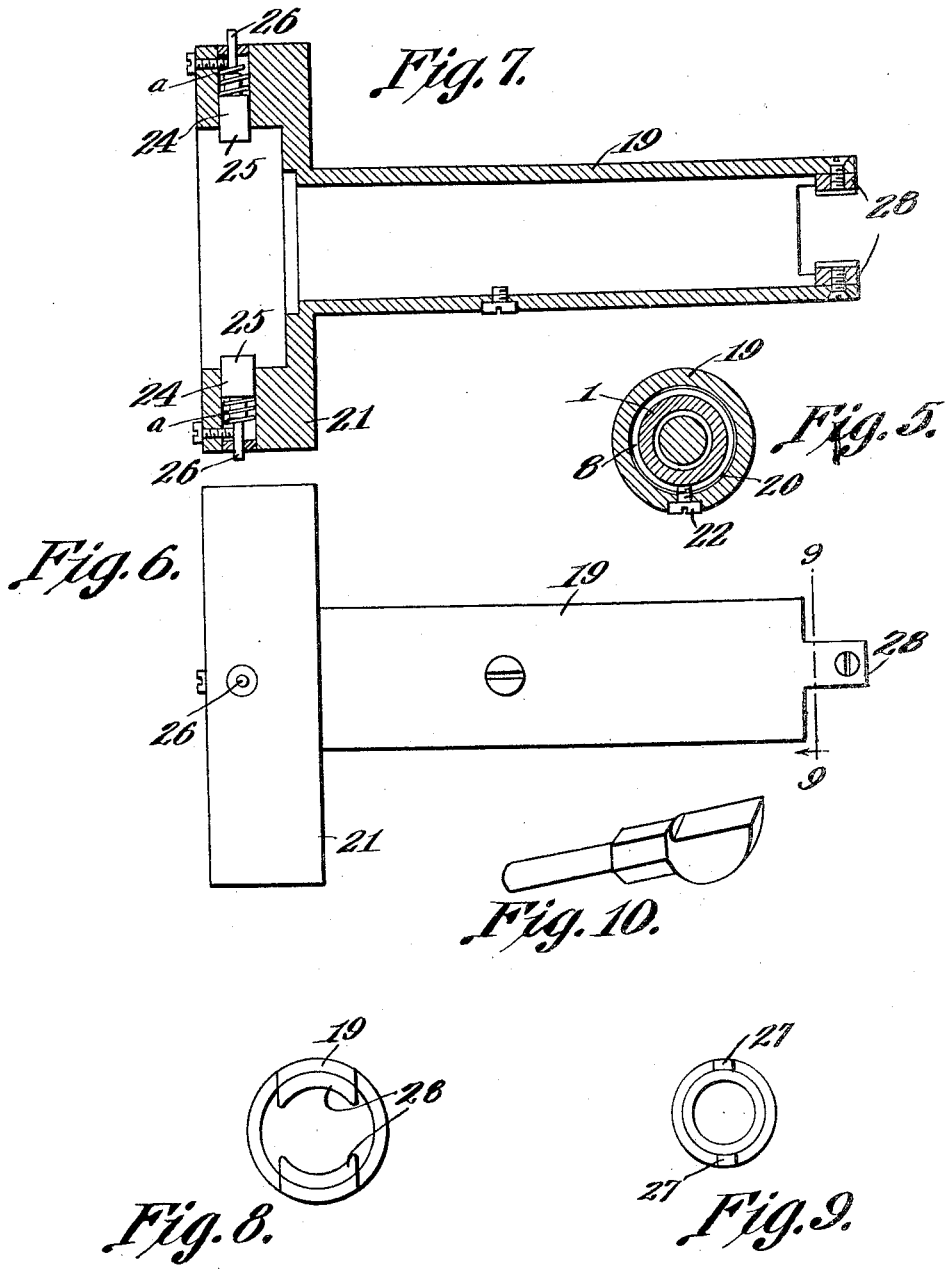

UNITED STATES PATENT OFFICE.

GEORGE THURMAN TYSON, OF HARRISBURG, PENNSYLVANIA.

SAFETY TAP AND DIE HOLDER.

1,126,919.  Specification of Letters Patent.  Patented Feb. 2, 1915.

Application filed April 21, 1913. Serial No. 762,629.

*To all whom it may concern:*

Be it known that I, GEORGE T. TYSON, a citizen of the United States, residing at Harrisburg, in the county of Dauphin and State of Pennsylvania, have invented a new and useful Safety Tap and Die Holder, of which the following is a specification.

The present invention relates to improvements in safety tap and die holders, the same being especially adapted for use in connection with automatic screw machines and being made convertible so that the same may be also used with a hand screw machine as carried by the turret of a turret lathe, one object of the present invention being the provision of an automatic device of this character, whereby should the tap or die extend too far out from the holder, the holder will automatically move longitudinally to prevent injury both to the tap or die and the stock, and should the tool become dull and cause too great friction, between the stock and tap or die, the holder will rotate circumferentially and thus release the strain thereon and prevent any damage either to the stock, tap or die.

A further object of the present invention is the provision of a novel form of tap and die holder, in which a surrounding member, or spaced sleeve which is adapted to be connected to the turret of the machine has mounted therein for longitudinal and also circumferential movement, the tap or die holder, a resilient means being provided to normally connect the tap or die holder, and which will permit the tap or die holder to move longitudinally with relation to the surrounding member, while means are provided so as to properly connect the holder to the tubular member, to allow a free circumferential movement of the said holder should the tap or die extend too far out, according to the length of the work to be threaded.

A still further object of the present invention is the provision of an arm fastened to the rear of the main body of the spaced sleeve provided with an engaging pin inserted into the ends of the holder to provide for the first lead of the tap or die upon the work by holding the body of the holder against rotation until the tap or die has formed threads sufficiently far in advance, to pass beyond said arm at which time the holder is free to rotate with the stock and until the work spindle is reversed there being means to automatically be released and a grip to hold the holder against rotation so that the tap or die is readily removed from the stock.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the complete device. Fig. 2 is a longitudinal sectional view through the complete device, the die being in operable relation within the holder. Fig. 3 is a section taken on line 3—3 of Fig. 1 looking in the direction of the arrow. Fig. 4 is a section taken on line 3—3 looking in the opposite direction. Fig. 5 is a section taken on line 5—5 of Fig. 2. Fig. 6 is a plan view of the holding member. Fig. 7 is a longitudinal sectional view therethrough. Fig. 8 is an end view of the holding member looking from the right as viewed in Fig. 6. Fig. 9 is a section on line 9—9 of Fig. 6. Fig. 10 is a perspective view of one of the pawls carried by the main holding member. Fig. 11 is a side elevation of the positive tap or die holder *per se*. Fig. 12 is a longitudinal sectional view thereof. Fig. 13 is an end view taken from the tap or die end thereof. Fig. 14 is a section taken on line 14—14 of Fig. 11.

Referring to the drawings, the numeral 1 designates the tubular member, whose bore is provided with the enlarged open portion 3, the other end of the member having connected thereto, the disk 5, which is provided with diametrically disposed ratchet grooves 6, whose edges are formed similarly so that the same will act as a pawl abutting means when rotated in either direction. The engaging pin 27 which operates or coacts with the arm 28, is fastened to the end of the tubular member 19, so as to cause the first lead of the cutting tool D when in work engaging position. Connected to the disk 5 and leading therefrom in the opposite direction to the tubular member 1, are the two guiding or leading-out pins 7, while formed circumferentially of the body of the member 1, intermediate of its ends, is a groove 8, the purpose of which will presently appear.

Surrounding the tubular member 1, near the head or disk 5 between the groove 8, is a spring 4, the purpose of which will presently appear.

The tap or die carrying member 9, is disposed to fit within the bore 2 of the member 1, and is capable of both rotary and longitudinal movements, the same being provided with the cut away portion 10 to reduce the point of wear with relation to the bore of the sleeve 1 to a minimum. The disk 11 is carried upon the die holding end of the member 9 and is substantially the same diameter as the disk 5 of the member 1, while provided in the other end of the member 9 is a threaded socket 12 for the reception of the screw 13, whereby the holder may be taken apart.

The disk 11 has formed integral and projecting in the opposite direction to the cylindrical member 9, the tap or die holding sleeve 14, which is provided with a diametrically disposed longitudinal slot 15, disposed to aline with the aperture 16 of the disk 11 and to receive the leading-out pin or guide 7 of the member 1. By this means the member 9 will be secured so as to be rigid with the member 1, during rotation but will be permitted a longitudinal movement relatively thereto, the purpose of which will presently appear.

In order to normally hold the disk 11 seated against the disk 5, and the tool holder 14 retracted, and a long leading out when the threading is of long dimensions, the spring 17 is mounted upon member 9 at the end carrying the screw 13, and seats within the enlargement 3 of the bore 2 of the member 1 and thus exerts a tension against the head of the screw 13 to hold the tool holder normally retracted within the disk 11 against the disk 5. In order to secure the die D within the holder 14, the set screw 18 is provided.

It is evident that a die or tap may be employed with this device, and that both exterior and interior screw threads may be cut as desired.

In order to make the die holder convertible and safe under all conditions, the member 1 is insertible within the bore 20 of the tubular member 19, and is held against longitudinal movement therein by means of the set screw 22, disposed to project through the wall of the member 19 to enter the groove 8 of the member 1. By this means, the member 1 may rotate within the member 19 and be permitted only a slight longitudinal movement. The spring 4, when the parts are assembled will normally hold the disk 5 seated well within the annular recess of the circular head 21 of the member 19. When so seated, as mentioned, against the disk 5 in retracted position, the ratchet teeth 6 are disposed so as to aline or register with the apertures 23 of the head 21, and while mounted within the apertures 23 will engage the periphery of the disk 5 and enter the recess 6 to cause the members to be held fast with the safety sleeve 19. The pawl 24 is provided with the enlarged portion 25 and with the reduced end 26, and is thus insertible from the interior so that the reduced ends will project exteriorly of the peripheral surface of the head 21. A spring $a$ is mounted upon the enlarged portion 25 of each of the pawls 24, to normally exert an inward tension upon the pawls to cause the same to engage the periphery of the disk 5. The portions of the pawls are non-circular so as to prevent the rotation of the pawls and also to permit the same to be removed so that engaging ends may be reversed to permit of the cutting of left hand threads instead of right hand threads upon the stock, and thus permit the rotation of the member in an opposite direction.

When the parts are in the position to start the first cut of thread, the disk 5 is seated within the recessed head 21, the pin 27 then being in a position to abut the arm 28 to hold the member 1 for rotation with the member 19. As the threads are cut, the holder 14 is gradually moved outwardly but due to the pin 7 still rotates with the disk 5 and the member 1. The spring 4 also acts outwardly and gradually pushes the disk 5 outward until finally the pin 27 is released from the arm 28 by being moved to the left thereof, as viewed in Figs. 1 and 2, at which time the member 19 rotates freely without rotating the member 1 and the holder 14 with its die D. The pawls 24 in this instance are mounted so as not to prevent the disk 5 from having a free rotation while the die is cutting the thread, but as soon as the member 19 is reversed in its movement, as when running the die D from the stock, the spring $a$ seats the pawls 25 in the recesses 6 of the disk 5 and thus the disk 5 and the holder 14 are rotated to remove the die from the finished stock and before the pin 27 is again moved to engage the arm 28.

The meaning of the word "convertible" is understood when it is known to mean that this device is operable with the safety sleeve attached to the tap or die holder, and also that this tap or die holder can be used without the safety sleeve as a positive device, such device being used as before stated to cut either right or left hand threads due to the formation and connection of the dies and the positioning of the respective removable pawls.

From the foregoing description taken in connection with the drawings, it is evident that any binding action of the stock due to the dullness of the tap or die, will cause the tool holding member to rotate within the safety sleeve 19 and thereby prevent any injury to the tap or die and the stock, and that should the stock be too long or the tap or die should extend out too far, that the die holding member will have imparted thereto a longitudinal movement relatively to the safety sleeve 19 without injury to the stock, tap or die.

Furthermore in converting this device from a safety tap and die holder to a positive tap and die holder, as clearly shown in Figs. 11 and 12, it will be noted that a combination of the member 14 carried upon the shaft 9 within the bore 2 of the member 1, provides an arrangement or structure that may be used with or without the safety sleeve 19 for positive threading either for external or internal threads and also for left or right hand threads as desired.

When the device, as shown in Figs. 11 and 12, is used, the shank thereof is properly connected in the turret of a screw machine and clamped against rotation. Therefore as the turret advances the tap or die holder to the work, the die D is set out sufficiently far to start the thread cutting operation, the spring 17 being held in position by the screw 13 and allowing the die holder end 14 to lead out or upon the guide pins 7, the shaft 9 having and receiving longitudinal movement through the bore 2 of the member 1 outwardly and away from the disk 5 until the work spindle of the screw machine is reversed, when the backward motion of the thread already cut will serve to withdraw the cutting tool, which will find its normal position automatically with the disk 11 seated in the disk 5, also held in this position by the spring 17. It is thus evident that the resilient pull or moving off of the work caused by the spring 17 will allow a smooth thread to be cut and cause the tool to recede from the work without tearing the same, even when the device is connected to a positive die and tap holder, thus providing a device which will be used both for tapping and threading.

The backward movement of the sliding die holding head 14, which, as usual, occurs in running off the die or tap from the work, is never opposed by the spring actuated pawls 24, although the spring exerts an inward pressure upon its pawls against the disk 5 when beginning the thread upon the work, the pressure being overcome by the grooves 6 when at a slight angle upon its edges and this with the angular point of the pawls 24 coacting thereupon, will only act as a ratchet, allowing a free rotary movement of the die holding head 14 and the member 1, because of the outward swing or movement of the pawls coacting against the relieved grooved edges in the forward motion. This feature, when taken in conjunction with the flexibility allowed in starting of the threads upon the work, by the springs 4 and the slight floating movement allowed the member in the bore of the member 20, will prevent the stripping of the thread.

The positive and uniform length of the thread being cut is insured by the engaging pin 27 sliding against the arm 28, the same really determining the amount of travel which the die head 14 may have without rotating with the work.

After the die head has traveled forward enough to free the engaging pin 27 from the arm 28, there is no further thread cutting, as the die head then being freed revolves with the work. When the spindle and work reverse, the die head usually reverses until the grooves 6 of the disk 5 engage the spring actuated pawls 24, this of course prevents further reverse rotation of the die head and as the work continues to rotate, the die or tap is unscrewed or removed. The spring 17 serves to hold the disk 5 and the die holding member 14 normally seated within the recessed head 21 of the member 19 when not threading, and also when in this position, the engaging pin 27 is not in such position as to act upon the arm 28 until the member 14 and the disk 5 are moved backward against the spring 4, then the pin 27 is placed in proper relation with the arm 28 to repeat the threading operation, as before mentioned. The spring 17 also has the advantage of preventing the tearing of the first few threads upon the work when backing off the die, providing after the thread has been cut and previous to the reversal of the work, the turret, together with the holder is pulled backward a distance equal to several threads. This action causes the spring 17 to be under tension and after the spindle has been reversed and the die unscrewed from the end of the work, the spring brings the die head and die clear of the end of the work that has been completed.

On account of the fact that alinement of the turret and spindle is not always to be had, a slight gyratory action between the body 1 of the holder proper and the carrying member 19 in the bore thereof, is permitted.

With this structure of die and tap holder, it is evident that the same may be used upon screw machines whose spindles will reverse, either rapidly or with tardiness.

From the foregoing it is evident that with a die and tap holder constructed according to the present invention, that a simple and practical device is provided, the same being readily converted into a safety device, to insure non-breakage of the taps or dies under usual or unusual circumstances that are met with threading upon screw machines.

What is claimed is:

1. A die or tap holder, including a tubular member having a disk at one end, a plurality of pins extending outwardly from the disk, a die containing member having a reduced cylindrical portion insertible through the bore of the tubular member, the die containing head thereof being adjacent the disk of the tubular member and provided with receptacles to slidably receive the pins of the disk, the pins and receptacles permitting the die containing member a longitudinal slidable movement relatively to the tubular member and holding both members for simultaneous rotation, a spring upon the reduced portion of the die carrying member and bearing against the tubular member to hold the die containing head resiliently in engagement with the disk of the tubular member, and a screw carried by the reduced portion of the die carrying member and surrounded by the spring to adjust the tension of the spring, a tubular casing for the tubular member and in which the tubular member is mounted for rotatory and longitudinal movements, and one end of which is socketed for the reception of the disk of the tubular member, and coöperative means carried by the casing and tubular member for holding the tubular member for rotation with the casing and until such tubular member has been moved longitudinally a predetermined distance.

2. A die or tap holder, including a tubular member having a disk at one end, a plurality of pins extending outwardly from the disk, a die containing member having a reduced cylindrical portion insertible through the bore of the tubular member, the die containing head thereof being adjacent the disk of the tubular member and provided with receptacles to slidably receive the pins of the disk, the pins and receptacles permitting the die containing member a longitudinally slidable movement relatively to the tubular member and holding both members for simultaneous rotation, a spring upon the reduced portion of the die carrying member and bearing against the tubular member to hold the die containing head resiliently in engagement with the disk of the tubular member, a screw carried by the reduced portion of the die carrying member and surrounded by the spring to adjust the tension of the spring, a tubular casing for the tubular member and in which the tubular member is mounted for rotatory and longitudinal movements, and one end of which is socketed for the reception of the disk of the tubular member, coöperative means carried by the casing and tubular member for holding the tubular member for rotation with the casing and until such tubular member has been moved longitudinally a predetermined distance, and means for holding the tubular member against rotation when the casing is rotated in a reverse direction.

3. In a die or tap holder, a main carrying tubular member, an auxiliary carrying member mounted within the main carrying member and capable of rotating and longitudinal movement therein, a die holding member mounted within the auxiliary member for longitudinal movement relatively thereto, and coactive means carried by the main and auxiliary members for holding the auxiliary member against rotation but permitting a limited longitudinal movement when under normal conditions.

4. In a die or tap holder, a main carrying member provided with an enlarged recessed head, an auxiliary member insertible within the main carrying member and provided with a disk to seat within the recessed head, a pin carried by the auxiliary member, a lug carried by the main carrying member for coaction with the pin to hold the auxiliary member for rotation with the carrying member under normal conditions, a longitudinally slidable die and tap carrying member insertible within the auxiliary member, and coacting means carried by the head and disk respectively of the holder and auxiliary member for permitting a longitudinal movement of the holder, and a spring for normally holding the holder retracted.

5. In a die or tap holder, a main carrying member provided with an enlarged recessed head, an auxiliary member insertible within the main carrying member and provided with a disk seated within the recessed head, coacting means carried by the head and disk of the auxiliary member for maintaining the auxiliary member relatively to the main carrying member under normal conditions, a lug at one end of the main carrying member, a pin carried by the auxiliary member for coaction with the lug to retain the holder against rotation during the starting of a thread cut, a longitudinally slidable die and tap carrying member insertible within the auxiliary member, a disk carried by the holder and seatable within the recessed head of the main member, and coacting means carried by the disk of the holder and the disk of the auxiliary member to connect the same for rotation with the auxiliary member and to permit a longitudinal movement of the holder relatively to the auxiliary member.

6. In a tap and die holder, a main carrying tubular member provided with a recessed head, an auxiliary tubular member mounted within the main member and having a disk seated within the recessed head of the main carrying member, spring actuated pawls carried by the head of the main carrying member and disposed to engage the disk to lock the auxiliary member against rotation during the reversing of the holder, a lug carried by the main carrying member, a pin carried in the end of the auxiliary member to engage the lug of the main carrying member to retain the auxiliary member against rotation in the main carrying member until the thread cutting has been primarily started by the die or tap, a pair of pins connected to the disk of the auxiliary member and projecting outwardly therefrom, a cylindrical rod mounted in the bore of the auxiliary member and capable of a sliding movement therein, a die and tap holding disk carried at one end of the rod and provided with apertures to receive the pins of the auxiliary member to cause the holder to rotate with the auxiliary member and to permit a longitudinal movement thereof, and a spring for normally holding the holder in retracted position.

In testimony that I claim the foregoing as my own, I have hereto affixed my signature in the presence of two witnesses.

GEORGE THURMAN TYSON.

Witnesses:
 HOPE SWENGEL,
 A. W. SWENGEL.